United States Patent
Kellerby et al.

(10) Patent No.: US 9,167,801 B2
(45) Date of Patent: Oct. 27, 2015

(54) INSECTICIDE STRIP AND COMBINATION WITH IDENTIFICATION EAR TAG

(71) Applicant: Y-TEX CORPORATION, Cody, WY (US)

(72) Inventors: Joe D. Kellerby, Cody, WY (US); Michael G. Fletcher, Cody, WY (US)

(73) Assignee: Y-TEX CORPORATION, Cody, WY (US)

( * ) Notice: Subject to any disclaimer, the term of this patent is extended or adjusted under 35 U.S.C. 154(b) by 237 days.

(21) Appl. No.: 13/799,468

(22) Filed: Mar. 13, 2013

(65) Prior Publication Data

US 2014/0083368 A1 Mar. 27, 2014

Related U.S. Application Data

(60) Provisional application No. 61/704,761, filed on Sep. 24, 2012.

(51) Int. Cl.
| | | |
|---|---|---|
| *A01K 29/00* | (2006.01) | |
| *A01K 13/00* | (2006.01) | |
| *A01K 11/00* | (2006.01) | |

(52) U.S. Cl.
CPC ............ *A01K 13/003* (2013.01); *A01K 11/001* (2013.01); *A01K 29/00* (2013.01)

(58) Field of Classification Search
CPC ... A01K 13/00; A01K 13/003; A01K 11/001; A01M 1/20; A01M 1/2016; A01M 25/00
USPC ............ 119/650, 652, 653, 655; 43/124, 131, 43/132.1
See application file for complete search history.

(56) References Cited

U.S. PATENT DOCUMENTS

| | | | | |
|---|---|---|---|---|
| 3,942,480 | A | * 3/1976 | Hair et al. | 119/655 |
| 4,059,074 | A | 11/1977 | Fürer et al. | |
| 4,184,453 | A | * 1/1980 | Ritchey | 119/655 |
| 4,366,777 | A | 1/1983 | Akhavein et al. | |
| 4,428,327 | A | 1/1984 | Steckel | |
| 4,506,630 | A | * 3/1985 | Hair | 119/654 |
| 4,562,794 | A | 1/1986 | Speckman | |
| 4,579,085 | A | * 4/1986 | McGuire | 119/655 |
| 4,581,834 | A | 4/1986 | Zatkos et al. | |
| 4,612,877 | A | 9/1986 | Hayes et al. | |
| 4,694,781 | A | * 9/1987 | Howe et al. | 119/655 |
| 4,706,610 | A | * 11/1987 | Morgan, Jr. | 119/653 |
| 4,750,284 | A | * 6/1988 | Parry et al. | 40/301 |
| 4,878,456 | A | * 11/1989 | Howe | 119/653 |
| 5,189,986 | A | * 3/1993 | Burkoth | 604/304 |
| 5,228,224 | A | 7/1993 | Gardner | |
| 5,725,261 | A | * 3/1998 | Rahn | 292/307 R |
| 6,405,462 | B1 | * 6/2002 | Gardner et al. | 40/301 |
| 6,546,652 | B1 | * 4/2003 | Gardner et al. | 40/302 |
| 7,441,354 | B2 | * 10/2008 | Ritchey | 40/300 |
| 7,690,141 | B2 | * 4/2010 | Steinfort et al. | 40/301 |

(Continued)

*Primary Examiner* — Rob Swiatek
*Assistant Examiner* — Morgan T. Barlow
(74) *Attorney, Agent, or Firm* — Harness, Dickey & Pierce, P.L.C.

(57) ABSTRACT

An insecticide impregnated strip configured for convenient and reliable attachment to conventional animal ear tags. The insecticide strip comprises an elongated integrally molded member having a key-hole shaped aperture formed in an upper portion thereof, enabling the elongated strip to be pendularly suspended from the ear tag. Various methods are disclosed for attaching the strip to different types of known ear tags.

10 Claims, 14 Drawing Sheets

(56) References Cited

U.S. PATENT DOCUMENTS

| | | | |
|---|---|---|---|
| 2003/0121188 A1* | 7/2003 | Haar et al. | 40/301 |
| 2003/0182831 A1* | 10/2003 | Haar et al. | 40/301 |
| 2007/0057085 A1* | 3/2007 | Trompen et al. | 239/36 |
| 2008/0222930 A1* | 9/2008 | Pennington et al. | 40/301 |

* cited by examiner

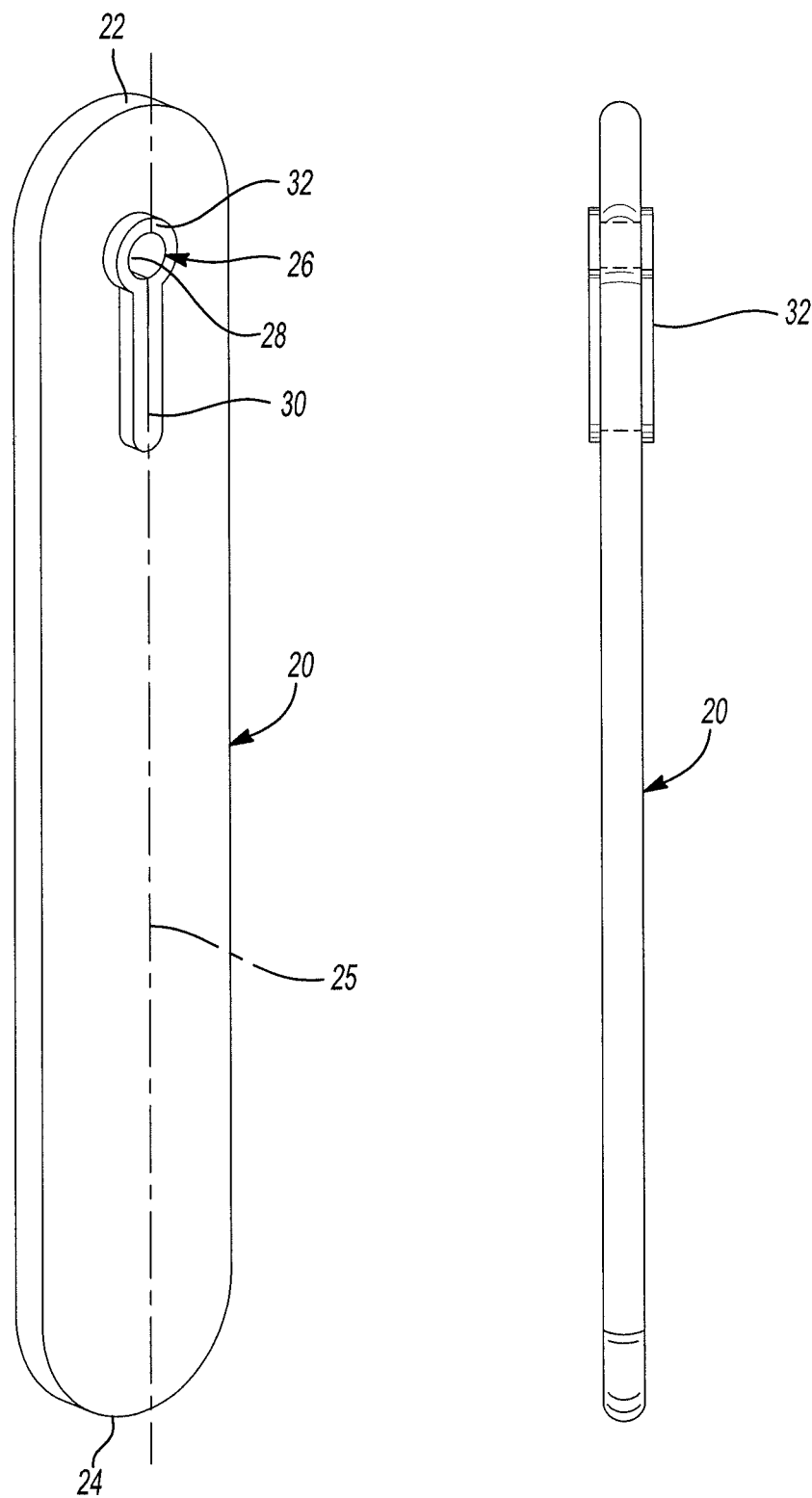

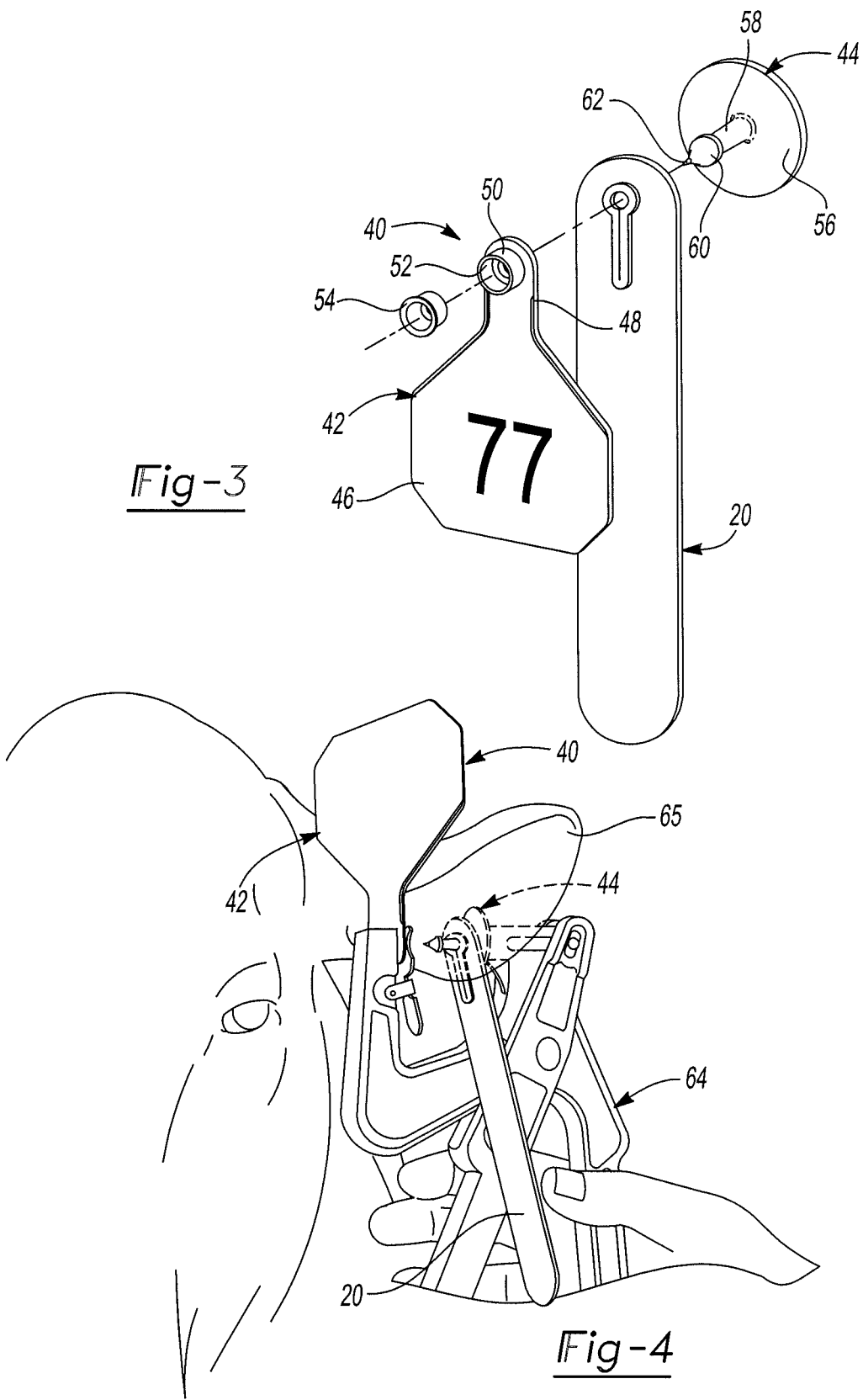

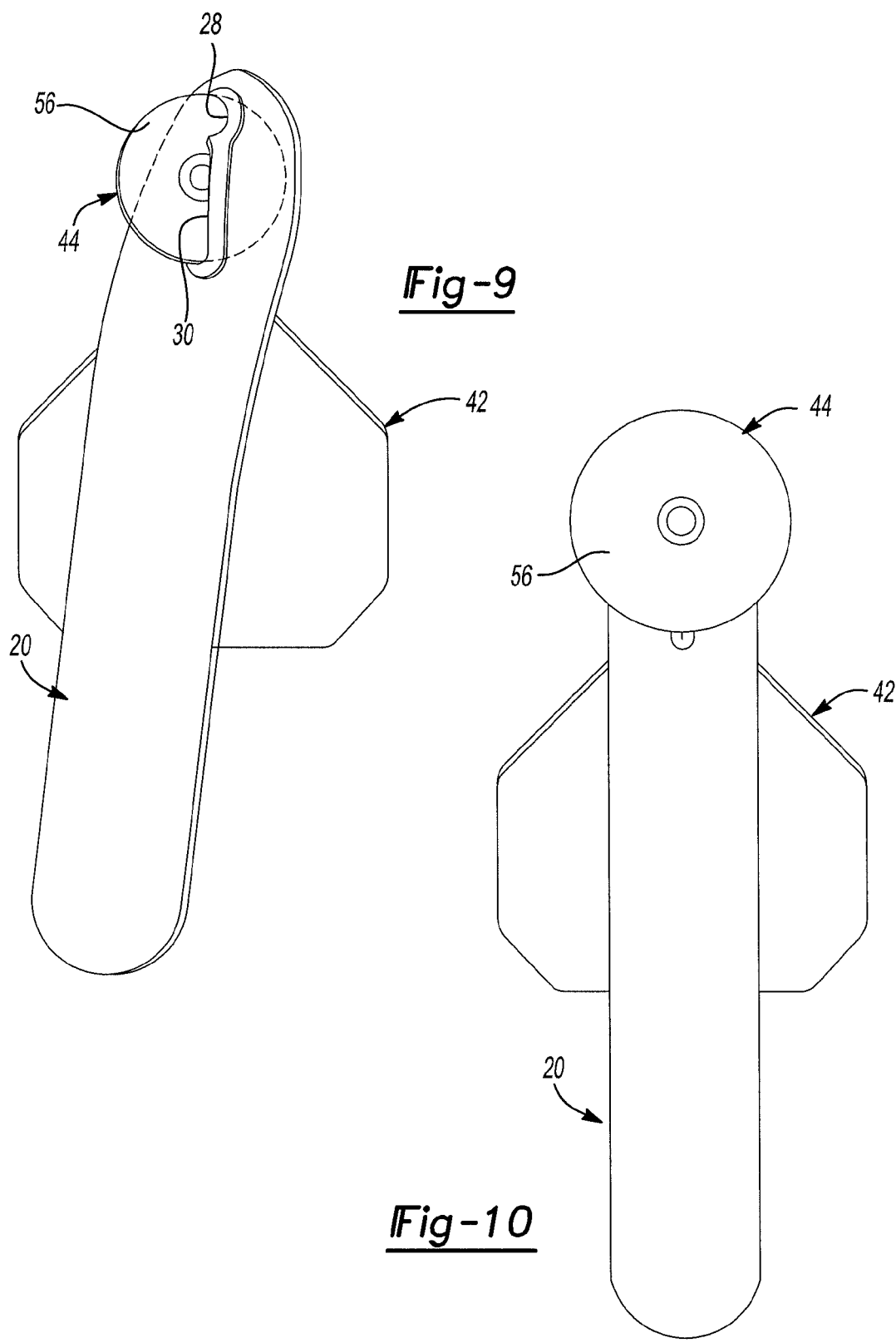

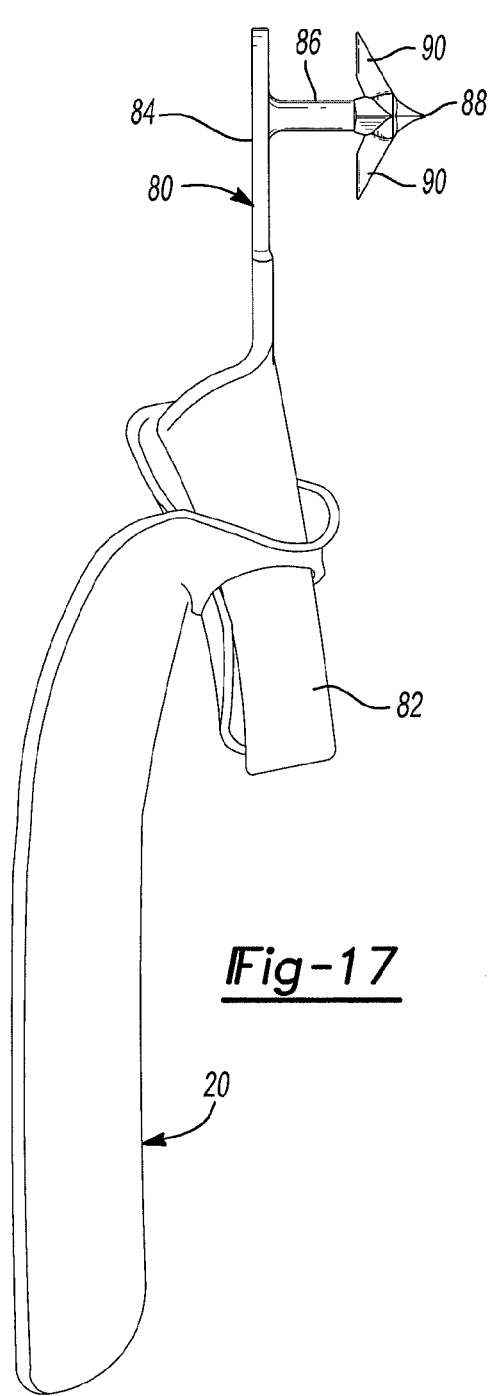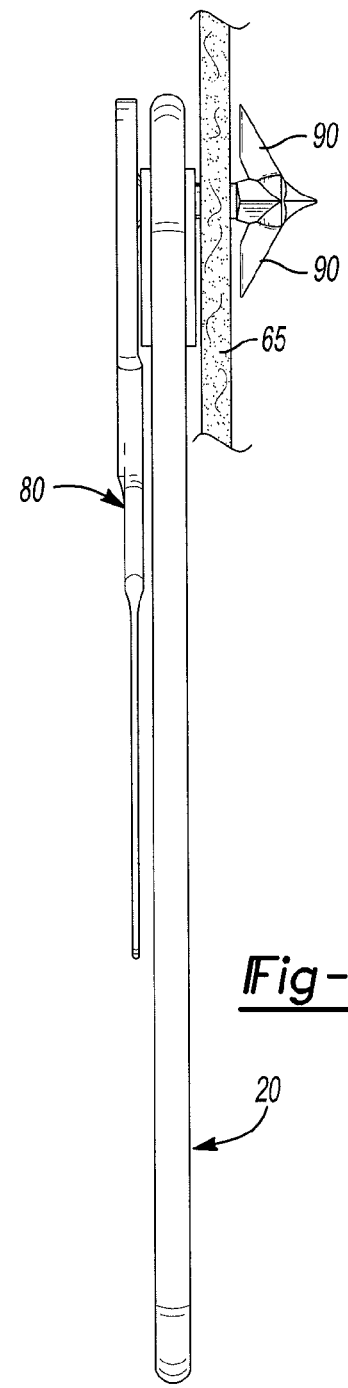
Fig-17
Fig-18

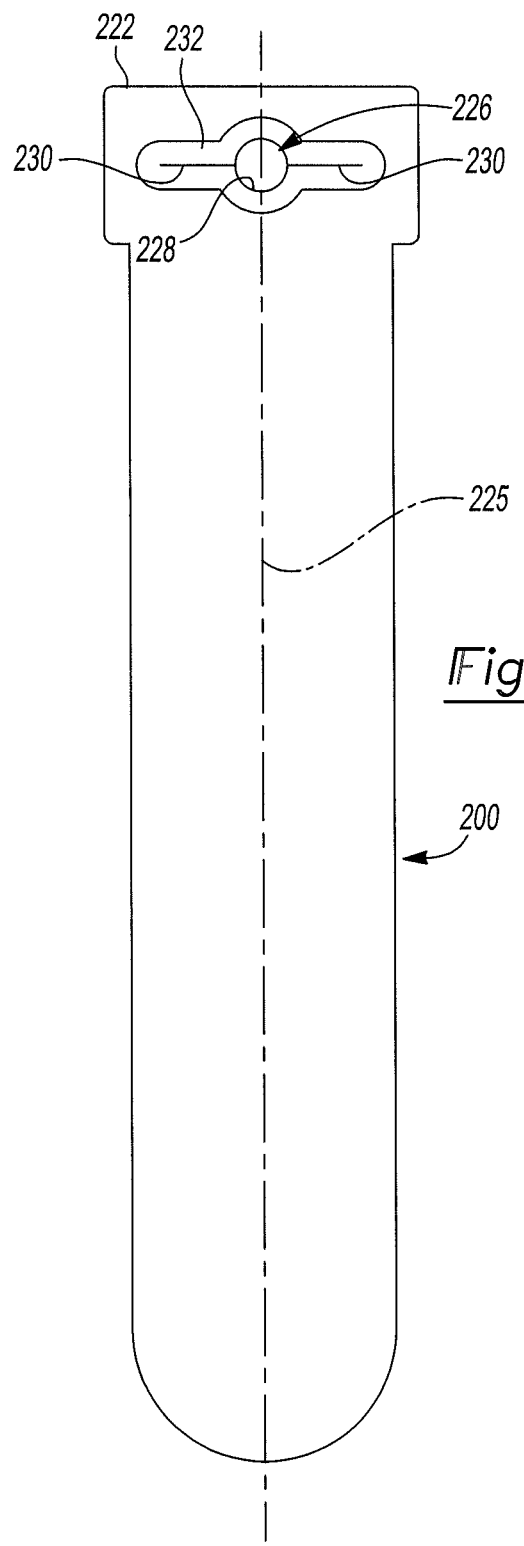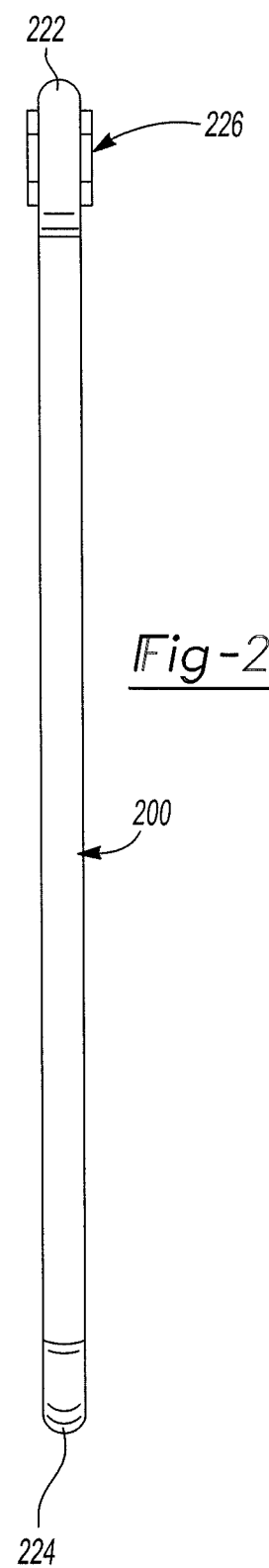

INSECTICIDE STRIP AND COMBINATION WITH IDENTIFICATION EAR TAG

CROSS-REFERENCE TO RELATED APPLICATIONS

This application claims the benefit of U.S. Provisional Application No. 61/704,761 filed on Sep. 24, 2012. The entire disclosure of the above application is incorporated herein by reference.

FIELD OF THE INVENTION

The present invention relates to an insecticide carrying strip for livestock and in particular to an insecticide impregnated strip that is designed for attachment to an ear of an animal or, alternatively, to a conventional identification tag, and to the combination of an insecticide impregnated strip and an identification tag, as well as to the method for attaching an insecticide impregnated strip to an ear of an animal, or to an identification ear tag, or to a spent insecticide ear tag.

BACKGROUND OF THE INVENTION

It is well known in the livestock industry to apply insecticide impregnated ear tags to livestock to control biting and nuisance flies, and other ectoparasites. To meet efficacy standards, it is generally necessary to apply an insecticide ear tag to each ear of the animal. An example of a known insecticide tag is shown in U.S. Pat. No. 4,581,834.

It is equally well known in the livestock industry to apply identification ear tags to livestock. So-called ID tags have been used not only to identify the owner of an animal, but now more commonly to identify a particular animal. ID tags therefore make it possible to not only maintain a record of the life of an individual animal, such as its history of disease, vaccination, etc., but also to enable tracking of meat from the livestock producer to the meat counter and back to the individual animal. ID tagging of livestock has thus become critically important to the regulatory control of the food supply.

Commercial ID tags are typically available in two different forms: as a two-piece tag of the type shown in the aforementioned U.S. Pat. No. 4,581,834, or as a so-called one-piece tag, as shown for example in U.S. Pat. No. 5,228,224. In each instance, the tag is installed in the ear of an animal with an applicator by creating a hole in the ear of the animal.

Recent European Union regulations requiring ID ear tags also specify that only one hole can be placed in each ear of the animal. Consequently, it is no longer permitted in Europe to install an ID tag and a separate insecticide tag in each ear of an animal. In addition, there is a growing reluctance on the part of livestock producers in general to apply two tags to one ear of an animal.

Previous attempts have been made to add an insecticide carrying component to an ID ear tag. For example, U.S. Pat. No. 4,428,327 describes a two-piece ID tag having a rectangular insecticide impregnated member that is secured to the bottom portion of the flat identification area of the tag. Optionally, a second insecticide impregnated member can be secured to the opposite side of the ID tag as well.

Long term retention of the insecticide members on the ID tag is problematic with designs of this type. Moreover, because only one side of the insecticide member is exposed, less insecticide is transferred to the animal. In addition, it is not practical with this known design to replace the insecticide member(s) in a way that will facilitate reliable retention of the replacement insecticide member(s) on the ID tag. As a result, combination tags of this type have not been widely commercialized.

A second prior art combination insecticide-ID tag is shown in U.S. Pat. No. 4,366,777, which discloses a one-piece ID tag having a separately attachable collar member, comprising an insecticide reservoir, that is wrapped around the neck portion of the ID tag. As the two ends of the collar member are designed to be adhesively secured to one another, long term retention of the insecticide reservoir on the ID tag is also clearly a problem with this known design. In addition, very limited surface area is provided on the insecticide reservoir, thus compromising the time period over which proper efficacy of the insecticide can be maintained.

A further combination tag is disclosed in U.S. Pat. No. 4,612,877. A first embodiment of the combination tag shown in this patent comprises a one-piece ID tag having an elongated dove-tail channel formed on the backside of the panel portion of the tag for slidingly receiving an insecticide tag member having a correspondingly-shaped attachment rib. A second embodiment shows a one-piece ID tag having a slot formed in the neck portion of the tag for receiving an enlarged arrow-shaped attachment head portion of an insecticide member. In both embodiments, long term retention of the insecticide member on the ID tag is problematic, due to the relative softness of the plastic material required for carrying insecticide, which makes it highly likely that the insecticide member will be ripped or torn from the tag when the animal rubs its head against its body or against other objects.

Lastly, U.S. Pat. No. 4,059,074 shows a one-piece ID tag having a disc-shaped insecticide carrier coupled to the stem portion of the tag. The circular insecticide disk has a central hole for receiving the stem of the tag and a slot extending radially from the central hole to the outer perimeter of the disk to enable the insecticide disk to be slipped over the stem for attachment to the tag. However, as noted above, due to the relative softness of the plastic material required to carry the insecticide, it is readily apparent the illustrated circular insecticide disk is susceptible to becoming separated from the ID tag in the same manner in which it is installed; namely by the stem of the tag slipping back through the radial slot in the disk.

Consequently, there is a commercial need for an alternative solution to the conventional insecticide ear tag.

SUMMARY OF THE INVENTION

The present invention solves the above-noted problems by providing an insecticide carrying strip that is uniquely configured to be conveniently and reliably attachable to an ear of an animal, as well as to the most commonly used types of commercial ID tags.

In addition, the insecticide strip according to the present invention is designed to be pendularly suspended from the post of the male portion of an ear tag member, including the most widely used types of ID tags, so that the strip is freely pivotable about the ear tag. This feature of the present invention provides multiple advantages. Firstly, the resulting pendulous movement of the strip when secured to the ear of an animal promotes the transfer of insecticide from the strip to the animal. Secondly, the freely pendular movement reduces the likelihood of the strip, which by its nature is made from relatively soft plastic material, being ripped or torn from the animal.

Furthermore, the insecticide strip according to the present invention is designed not only to exceed retention standards, but is also conveniently replaceable without compromising the integrity of the ear tag to which it is attached. This is an important feature of the present invention as ID tags are intended, and increasingly required by applicable regulations, to remain attached to the animal for its entire life, whereas insecticide tags are designed to be replaced every 3-5 months, depending upon geographic location. In addition, for most effective control, spent insecticide tags are typically replaced with new tags containing different active ingredients to prevent the development of resistant strains of insects. Consequently, the design of the present invention contemplates frequent and convenient replacement.

Moreover, because the insecticide impregnated strip according to the present invention does not require the reapplication of an entirely new ear tag each time it is in need of replacement, as with conventional insecticide ear tags, the number of holes that are created in the ear of an animal over its lifetime is greatly reduced. This feature of the present invention can be particularly advantageous with dairy cattle which typically survive much longer than cattle raised for beef.

The present invention also contemplates the use of the insecticide strip as a component of an insecticide ear tag permitting the insecticide strip portion to be periodically replaced without the need of a conventional ear tag applicator each time the insecticide strip portion is replaced.

Finally, the present invention contemplates the use of the insecticide strip as a replacement for the spent insecticide-carrying portion of an insecticide ear tag and discloses a method for replacing the spent portion of an insecticide ear tag by attaching the insecticide strip to the remnant parts of the spent insecticide ear tag, again without the need of a conventional ear tag applicator.

BRIEF DESCRIPTION OF THE DRAWINGS

The drawings described herein are for illustrative purposes only of selected embodiments and not all possible implementations, and are not intended to limit the scope of the present disclosure.

FIG. 1 is a perspective view of an insecticide strip in accordance with the present invention;

FIG. 2 is a side edge view of the insecticide strip shown in FIG. 1;

FIG. 3 is an exploded view of a two-piece ear tag and the insecticide strip shown in FIG. 1;

FIG. 4 illustrates a method of installation of the two-piece ear tag and insecticide strip combination shown in FIG. 3 on to the ear of an animal;

FIGS. 7-10 illustrate an alternative method for installing the insecticide strip shown in FIG. 1 onto the two-piece ear tag shown in FIG. 3;

FIGS. 17-18 illustrate a method of installing the insecticide strip shown in FIG. 1 onto the one-piece tag shown in FIG. 16;

FIGS. 25-26 illustrate an alternative embodiment of the insecticide strip according to the present invention.

DETAILED DESCRIPTION OF THE PREFERRED EMBODIMENTS

Figure 5:
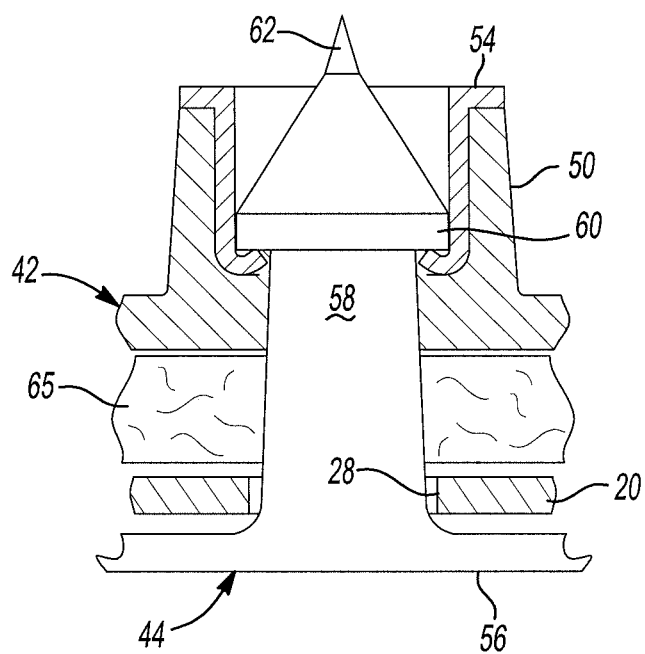
FIG. 5 is an enlarged sectional view of the two-piece ear tag and insecticide strip combination show in FIG. 3, installed in an ear of an animal.

Referring to FIG. 1, a perspective view of an insecticide carrying strip 20 according to the present invention is shown. The strip 20 preferably comprises an elongated substantially flat, plastic strap having rounded portions end 22 and 24. The strip 20 generally defines an elongated central axis 25 which in turn defines the upper and lower end portions, 22 and 24 respectively. In a preferred embodiment, the strip 20 is injection molded as an integral member approximately 6 inches in length, 1¼ inches in width, and approximately ¹/₁₆ of an inch thick. The strip 20 is made of a flexible, relatively soft, polyvinyl chloride, suitable for being impregnated with an insecticide in a manner well known in the art. However, other suitable materials may be used. The resulting large surface area of the strip 20 enables the strip to carry a relatively large quantity of insecticide, thereby improving long term efficacy of the strip.

Formed in the upper end portion 22 of the strip 20 is a "key-hole" shaped aperture 26, comprising a circular hole portion 28 and a downwardly extending slit portion 30. Note, the strip 20 may be formed during the injection molding process with a thin frangible web connecting the adjoining sides of the slit portion 30 of aperture 26.

The circular hole portion 28 of the aperture 26 is preferably centered on the axis 25 with the slit portion 30 extending downwardly along the axis 25. The diameter of the hole portion 28 is preferably sized to be slightly larger than the diameter of the stem portion of the male button component of a standard two-piece ID tag, for the reasons described below. In addition, the length of the slit portion 30 is designed so that, when combined with the diameter of the hole portion 28, the combined distance is approximately equal to or slightly greater than the diameter of the round flange portion of the male component of a standard two-piece ID tag, for reasons also described below. As clearly shown in the drawings, however, the diameter of the circular hole portion 28 comprises a minor portion of the combined axial length of the aperture 26. As will be appreciated from the discussion below, this feature of the key-hole shaped aperture 26 greatly enhances the retention characteristics of the strip 20.

To help insure against tearing of the upper end portion 22 of the strip 20 adjacent the aperture 26, the boundary of the key-hole shaped aperture 26 is completely closed and reinforced by the formation of a thickened border area 32 immediately surrounding the entire boundary of the aperture 26. As best shown in FIG. 2, this reinforced border area 32 is preferably formed on both sides of the strip 20 so that the overall thickness of the plastic material in the border area 32 is approximately twice the thickness of the remainder of the strip 20.

The strip 20 can be preferably impregnated with insecticide compounds having a variety of EPA-approved active ingredients, including without limitation, pyrethroid, permethrin, zeta-cypermethrin, ivermectin, avermectin, abamectin, milbemectin, diazinon and chlorpyrifos, or any combination thereof.

Referring now to FIGS. 3-15, various methods for attaching the present insecticide strip 20 to an animal will now be explained. FIG. 3 illustrates an example of a widely used, commercially available two-piece ID ear tag 40. The ID tag 40 comprises a female tag component 42 and a male tag component 44. The female tag component 42 has an enlarged lower panel portion 46 that tapers to a relatively narrow upper neck portion 48. Located on the upper neck portion 48 is an integrally formed locking receptacle, comprising a cylindrical boss 50 defining a well 52 and optionally containing a locking insert 54. The locking insert 54 has a hole formed in its base that aligns with a hole in the base of the well 52 that extends through to the backside of the female tag component. Note, some commercially available two-piece ID tags do not include a locking insert.

The male tag component 44 comprises a circular flange 56 having an integral stem portion 58 projecting therefrom. Stem portion 58 has a circular cross-section and may be formed with a slight taper such that the diameter of the stem portion 58 is greatest at its base where it joins the flange 56. The distal end of the stem portion 58 comprises an enlarged head portion 60 that terminates in a sharp point 62.

Figure 6:
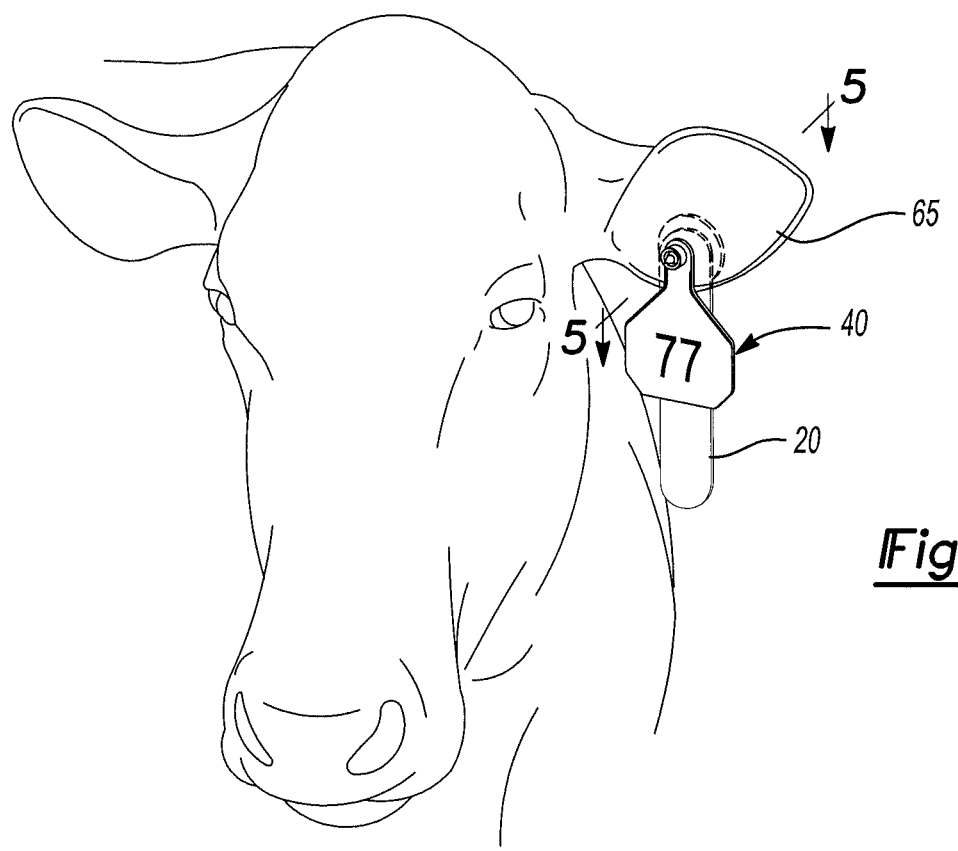
FIG. 6 is a pictorial view of the installed combination shown in FIG. 5.

As shown in FIGS. 4-6, the two-piece ID tag 40 is installed in the ear of an animal using an applicator 64 that drives the male tag component 44 to first pierce the ear 65 of the animal and then pass through the hole in the female tag component 42 until the enlarged head portion 60 of the stem 58 locks in the locking insert 54, or in the well 52 of the female tag component 42. The construction and installation of a two-piece ID ear tag of this type is more fully described in U.S. Pat. No. 4,581,834, which is incorporated herein by reference.

With particular reference to FIGS. 4 and 5, the method of securing the insecticide strip 20 to the two-piece ID ear tag 40 will now be explained.

At the time of installation of the two-piece ID tag 40 to the ear of an animal, the insecticide strip 20 can be readily secured to the ID tag 40 by inserting the enlarged head portion 60 of the male tag component 44 through the key-hole aperture 26 so that the stem 58 resides in the circular hole portion 28 of the aperture 26. Preferably, the diameter of the circular hole portion 28 of the aperture 26 is slightly larger than the diameter of the stem portion 58 of the male tag component 44 so that the insecticide strip 20 is pendularly supported on the stem 58. Additionally, it will be appreciated that the size of the aperture 26 will expand somewhat from the substantially closed static condition shown in FIG. 1 to accommodate the passage of the enlarged head portion 60. The ID tag components 42 and 44 are then loaded onto the applicator 64 as illustrated in FIG. 4, and the two-piece ID tag 40 is installed in the ear of the animal in the manner described above. Hence, when the ID tag 40 is installed in the ear of an animal, the insecticide strip 20 is preferably positioned between the circular flange 56 and the backside of the ear 65 of the animal as shown in FIGS. 5 and 6.

Due to the fact that the slit portion 30 of the aperture 26 remains substantially closed in the static condition of the strip 20 shown in FIGS. 1, 3 and 6, the likelihood of the strip 20 unintentionally separating from the ear tag 40 is greatly diminished. In particular, the closed condition of the slit portion 30, coupled with the effect of gravity, combine to confine the stem portion 58 of the male tag component 44 to the circular hole portion 28 of the aperture 26. Consequently, because the circular flange 56 of the male tag component 44 is substantially larger than the circular hole portion 28 of the aperture 26, it is highly unlikely that the strip 20 can be inadvertently manipulated to separate from the ear tag. Hence, the retention characteristics of the present insecticide strip 20 are greatly enhanced.

When it is time to replace the insecticide strip 20 on an installed ID tag 40, the old strip 20 is cut from the ID tag 40 and the new replacement insecticide strip 20 is attached to the tag 40 in accordance with the procedure shown in FIGS. 7-10.

Figure 7:
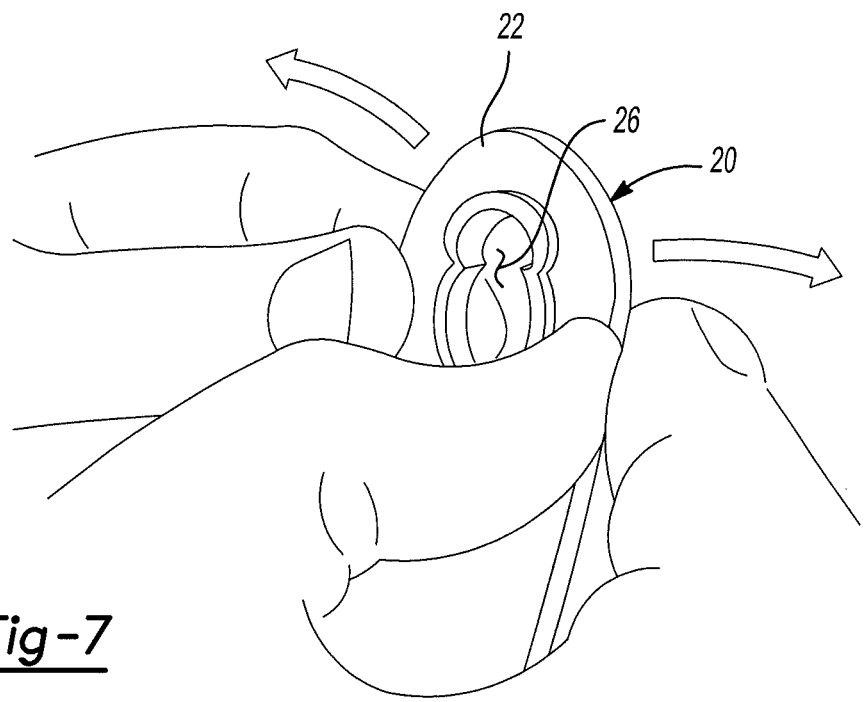
Figure 8:
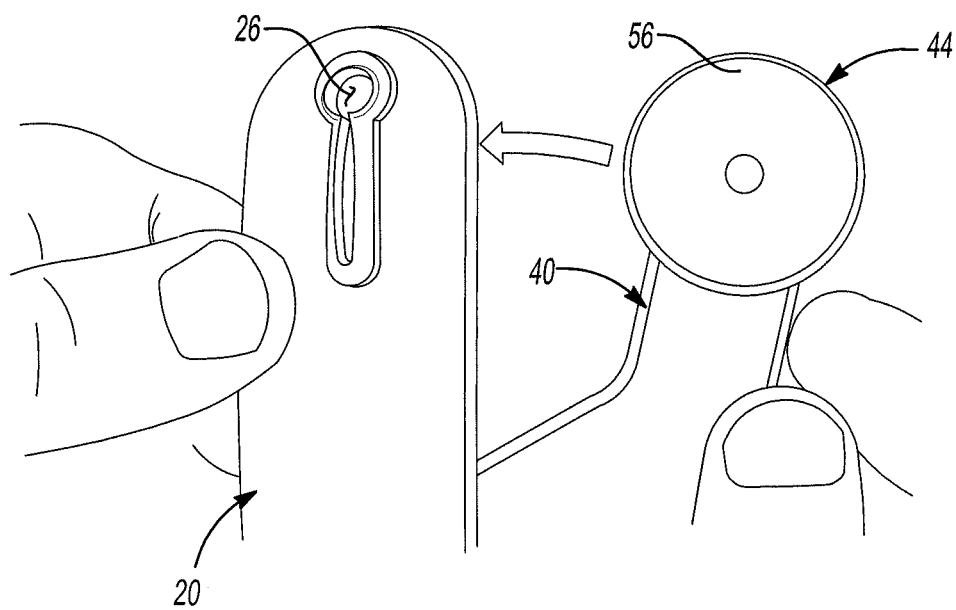

Due to the elastic nature of the insecticide strip 20 and the configuration of the aperture 26, the aperture presents a substantially closed opening in its static condition wherein the size of the aperture opening is minimized. In this static condition, the slit portion 30 of the aperture 26 is essentially closed such that the size of the aperture opening is limited to the circular hole portion 28 of the aperture 26. However, by grasping and pulling apart the upper end portion 22 of the strip 20 on either side of the aperture 26 in the direction of the arrows shown in FIG. 7, the slit portion 30 of the aperture 26 is opened, thereby substantially enlarging the aperture opening. This step also serves to break any frangible web that may have been formed during the injection molding process between the adjoining sides of the slit portion 30 of the aperture 26. The ability to elastically enlarge the aperture 26 is advantageously utilized when attaching the strip 20 to an installed ID tag 40. In particular, the key-hole aperture 26 in the replacement strip 20 is initially opened as illustrated in FIGS. 7-8. Once the aperture 26 has been opened, the circular flange portion 56 of the male tag component 44 is then inserted into and pushed completely through the aperture 26, as shown in FIG. 9. To facilitate this procedure, the length of the slit portion 30 of the key-hole aperture 26 is designed so that, in combination with the diameter of the circular hole portion 28, the length of the combined opening is preferably approximately equal to or slightly larger than the diameter of the circular flange portion 56 of the male tag component 44 of the ID tag 40. Because the insecticide strip 20 is made from a relatively soft polyvinyl chloride, the plastic material is sufficiently flexible to enable the strip to pass relatively easily over the flange 56 of the male tag component 44. In addition, the reinforced boundary 32 surrounding the aperture 26 insures against tearing of the insecticide strip 20 during this procedure. Once installed over the circular flange 56 of the male tag component 44, the insecticide strip 20 is pulled downward until the stem 58 of the ID tag 40 is positioned in the circular hole portion 28 of the aperture 26. Due to the inherent resiliency in the material of the insecticide strip 20, once the stem 58 is located in the circular hole portion 28, the aperture 26 will return to its closed static condition, wherein the slit portion 30 is substantially closed. Moreover, once the stem 58 is positioned in the circular hole portion 28, the reinforced key-hole configuration of the aperture 26 will act to retain the stem 58 in this position. Thus, even though the overall size of the aperture 26, when opened, is sufficient to accommodate the passage of the circular flange portion 56 of the male tag component 44, the key-hole configuration of the aperture 26 makes it highly unlikely that the strip 20, once attached, can be inadvertently manipulated and separated from the ear tag 40. This is due in part to the fact that the slit portion 30, when opened, comprises the majority portion of the aperture opening. Additionally, it will be appreciated that by completely closing the entire boundary of the aperture 26, the aperture 26 is better able to remain in its closed static condition once attached to the ear tag, thereby greatly enhancing the retention characteristics of the present insecticide strip 20.

It will further be appreciated that the method described above for replacing an insecticide strip 20 on an installed two-piece ID tag 40 can also be used during initial installation of the ID tag on an animal. In other words, the process illustrated in FIGS. 7-10 can alternatively be employed following initial installation of the ID tag to secure the insecticide strip 20 to the ID tag 40, rather than using the process described in connection with FIG. 4, if desired.

Thus, once properly installed, the insecticide strip 20 according to the present invention is securely retained on the ID ear tag 40 for the useful life of the insecticide strip. Moreover, because the circular hole portion 28 of the key-hole aperture 26 in the strip 20 is designed to be slightly larger than the diameter of the stem 58 of the male component 44 of the ID tag 40, the strip 20 is pendularly suspended from the ID tag 40, thereby enabling the strip 20 to freely pivot about the stem 58 of the ID tag 40. The ability of the strip 20 to freely pivot about the stem 58 of the ID tag 40 significantly enhances the long-term retention characteristics of the strip 20 by reducing the likelihood of the strip 20 being torn from the ID tag when the animal rubs its head against its body or other objects. In addition, the pendular movement of the strip 20 also enhances the transfer of insecticide from the strip 20 to the body of the animal.

Figure 11:
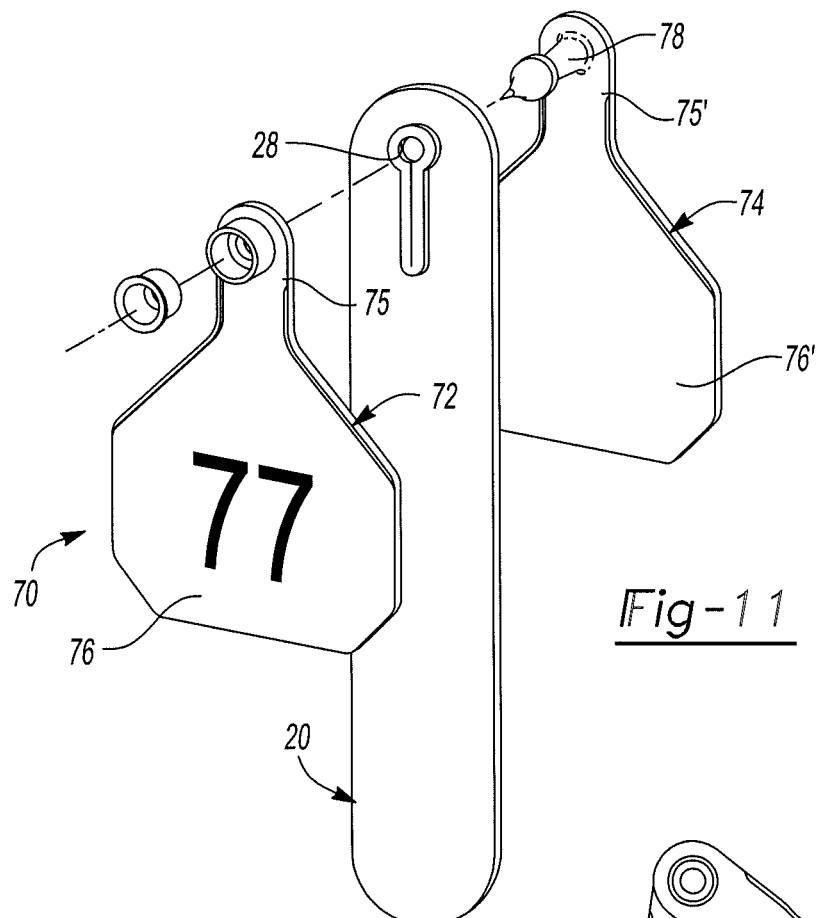
FIG. 11 illustrates an alternative version of a two-piece ear tag in combination with the insecticide strip shown in FIG. 1.

Turning now to FIG. 11 an alternative type of commercially available two-piece ID tag 70 is shown.

The two-piece ID tag 70 shown in FIG. 11 is designed to provide a fully visible panel portion on both sides of an animal's ear. Consequently, whereas the female tag component 72 of the ID tag 70 is essentially identical to the female tag component 42 of the ID tag 40 shown in FIG. 3, the male tag component 74 is also formed with an enlarged lower panel portion 76' similar to the panel portion 76 of the female tag component 72. In other words, instead of a circular flange, the integral stem portion 78 of the male tag component 74 projects from a relatively narrow upper neck portion 75' that tapers outwardly to the lower panel portion 76'. As a result, the planar profile of the male 74 and female 72 tag components of this type of two-piece ID tag 70 are substantially identical in appearance.

During initial installation of a two-panel ID tag 70 of this type, an insecticide strip 20 according to the present invention can be secured to the ID tag 70 using the same procedure described above in connection with FIG. 4.

Figure 12:
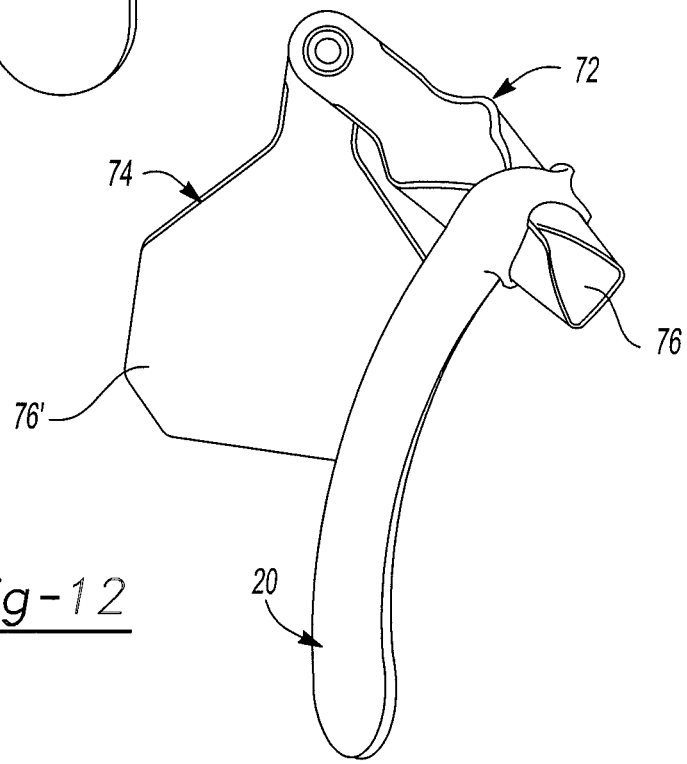
FIGS. 12-14 illustrate a method of installing the insecticide strip shown in FIG. 1 onto the two-piece ear tag shown in FIG. 11.
Figure 13:
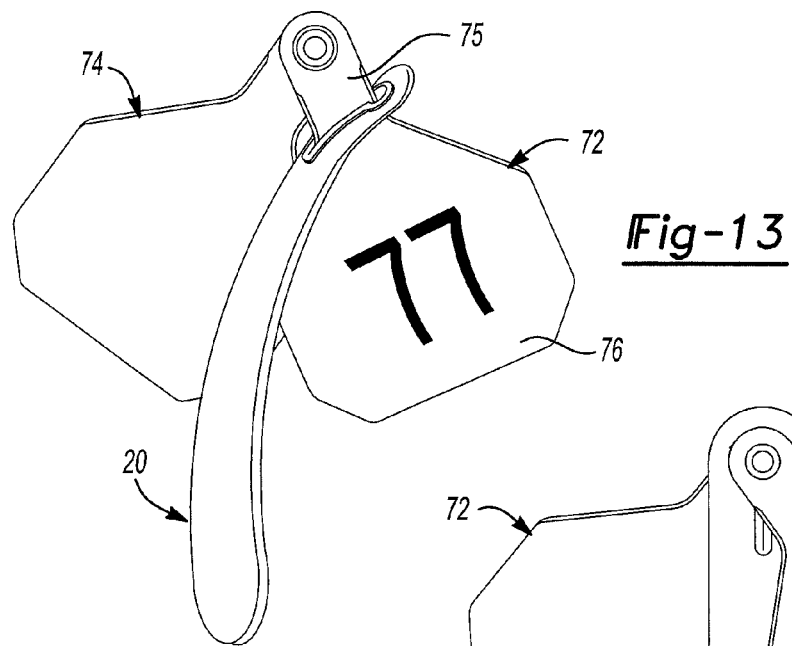
Figure 14:
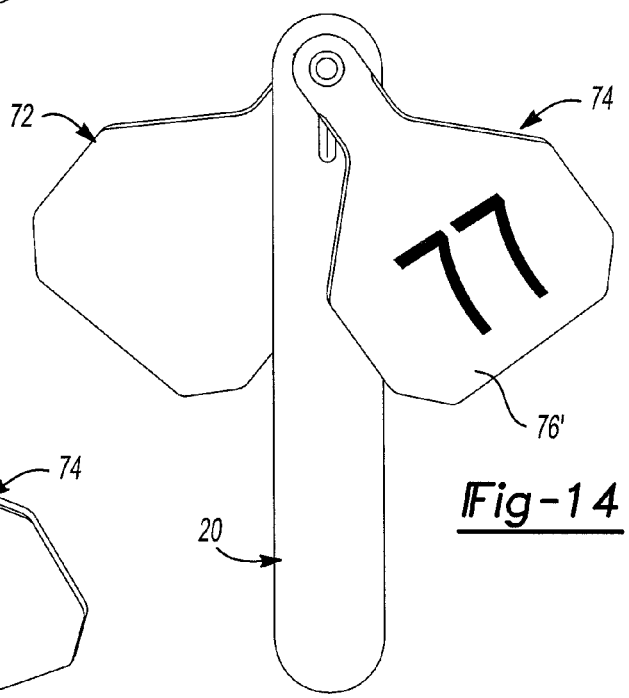

Alternatively, and also when necessary to replace an old insecticide strip, the process illustrated in FIGS. 12-15 may be used to secure an insecticide strip to a two-panel ID tag 70. Firstly, the panel portion 76 or 76' of either the female 72 or the male 74 tag component is "rolled" into a substantially cylindrical shape as shown in FIG. 12. The key-hole shaped aperture 26 of the insecticide strip 20 is pulled open and the rolled panel portion 76 is then inserted into the aperture 26. As noted above, the reinforced boundary 32 surrounding the aperture 26 insures against tearing of the insecticide strip 20 during this procedure. Due to the inherent resiliency of the plastic, once the rolled panel portion 76 is fully inserted through the aperture 26, the panel 76 will naturally return to its original flat shape, as shown in FIG. 13. Finally, the key-hole shaped aperture is passed over the upper neck portion 75 of the ID tag 70 and then the insecticide strip 20 is pulled downward until the stem 78 is positioned in the circular hole portion 28 of the aperture 26.

Figure 15:
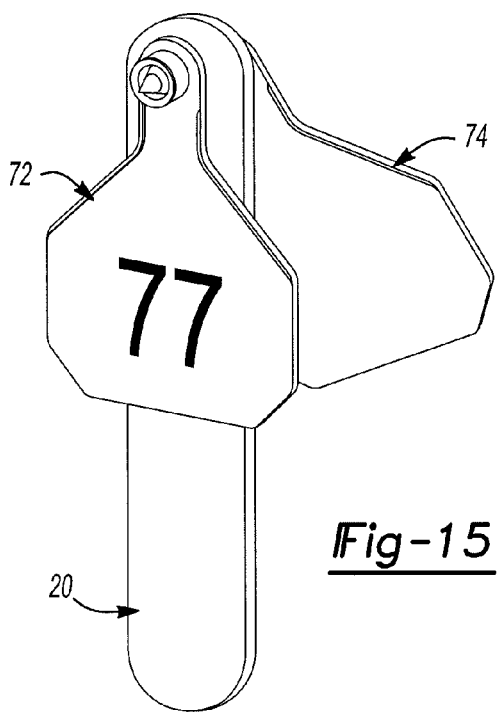
FIG. 15 illustrates the completed installation of the insecticide strip shown in FIG. 1 on the two-piece ear tag shown in FIG. 11.

As best shown in FIG. 15, the length of the insecticide strip 20 according to the present invention is preferably substantially greater than the length of a typical commercially available ID tag. Consequently, even when secured to a two-panel ID tag 70 of the type shown in FIGS. 14 and 15, a substantial portion of the strip 20 extends below the ID tag, thereby exposing a large surface area of the strip 20 to insure proper transfer of the insecticide to the animal.

Figure 16:
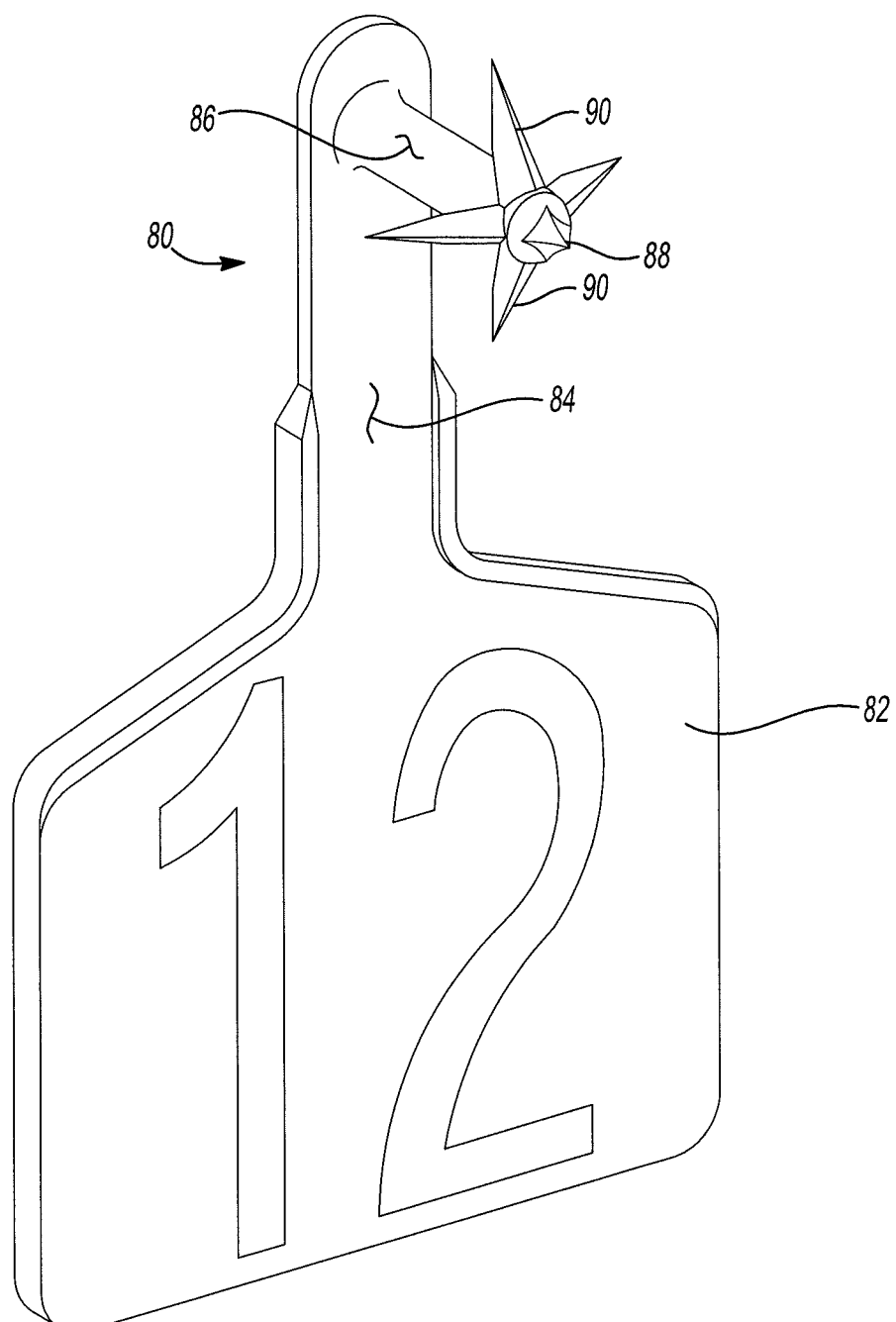
FIG. 16 is a perspective view of a one-piece ear tag.

Turning now to FIG. 16, an example of a commercially available one-piece ID tag 80 is shown. One-piece ID tag 80 corresponds to the tag illustrated and described in copending U.S. application Ser. No. 13/204,030, which is assigned to the assignee of the present application, and is incorporated herein by reference. As more fully described therein, one-piece ID tag 80 comprises a lower panel portion 82 that tapers to a relatively narrow upper neck portion 84. Projecting transversely from the upper neck portion 84 is an integral stem portion 86 that terminates at its distal end in a sharp point 88. A plurality of radially extending barbs 90 project from the stem portion 86 immediately aft of the pointed end 88. The radially extending barbs 90 are designed to resiliently fold inwardly toward the stem 86 during installation and then spring outwardly to their original positions after the pointed distal end portion 88 of the tag has pierced through the ear 65 of the animal, to thereby secure the tag to the animal.

Preferably, the insecticide strip 20 according to the present invention is secured to the one-piece ID tag 80 in the same manner as that described above in connection with the two-panel ID tag 70. In particular, as shown in FIG. 17, the panel portion 82 of the one-piece tag 80 is initially rolled into a cylindrical shape and then inserted into the opened key-holed shaped aperture 26 in the strip 20. Once pulled completely past the panel portion 82, the aperture 26 is then passed over the top of the upper neck portion 84 and then the strip 20 is pulled downward until the stem 86 of the tag is positioned in the circular hole portion 28 of the aperture 26, as shown in FIG. 18. Note, because the diameter of the stem 86 of the one-piece ID tag 80 is substantially equivalent to the diameter of the stems 58, 78 of the aforementioned two-piece ID tags 40, 70, the attached strip 20 is pendularly suspended from the stem 86 of the tag 80 in the same manner described above with respect to the two-piece ID tags.

Note also, when the insecticide strip 20 is secured to the one-piece ID tag 80 in the manner described, the strip 20 resides between the panel portion 82 of the tag and the backside of the ear of the animal, as illustrated in FIG. 18. For most commercially available one-piece ID tags, the positioning of the insecticide strip 20 in this manner is preferred to insure proper retention for the useful life of the strip 20.

Figure 19:
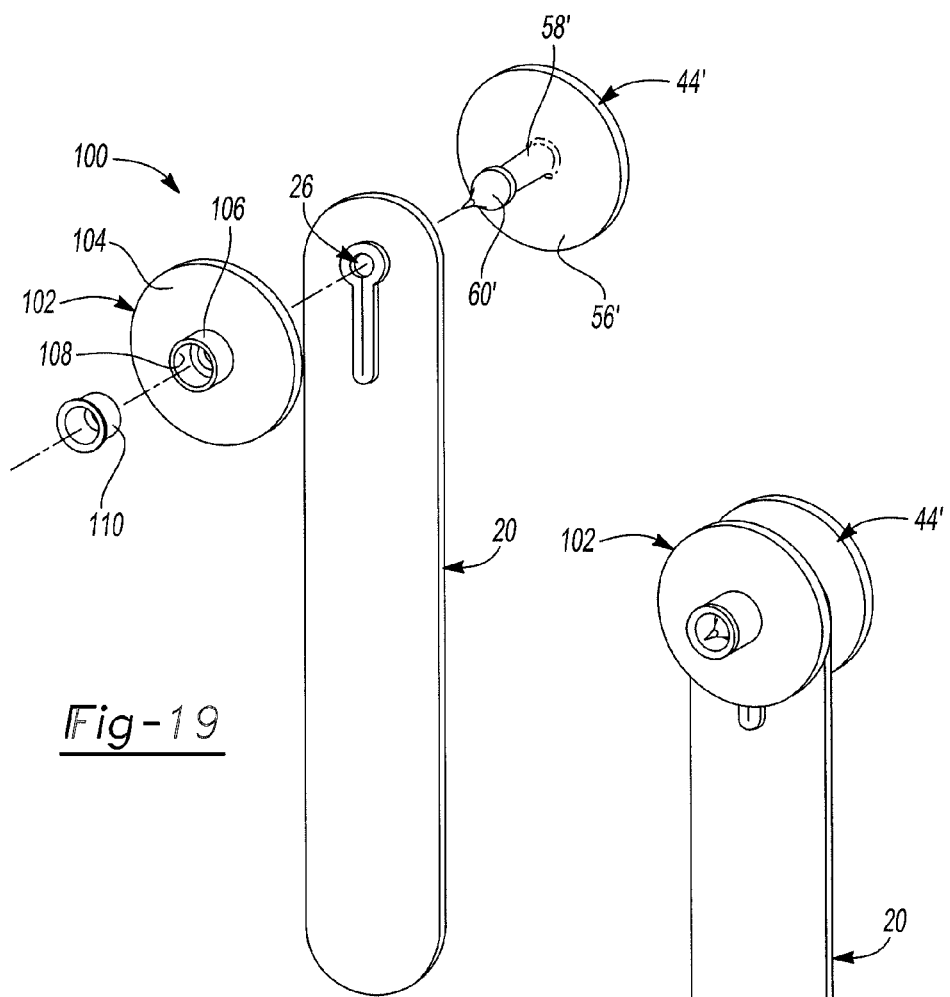
FIG. 19 illustrates an exploded view of an insecticide ear tag including the insecticide strip shown in FIG. 1.
Figure 20:
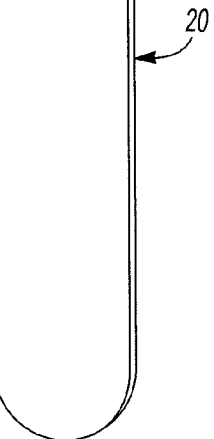
FIG. 20 illustrates a fully assembled insecticide ear tag as shown in FIG. 19.

Referring now to FIGS. 19-20, an insecticide ear tag 100 comprising the insecticide strip 20 according to the present invention is shown. The insecticide ear tag 100 comprises three components: the insecticide strip 20 shown in FIG. 1, a male tag component 44' corresponding to the male tag component 44 shown in FIG. 3, and a female tag component 102. Female tag component 102 has a circular flange 104, comparable to the circular flange 56' on the male tag component 44'. Centrally located on the circular flange 104 is an integrally formed cylindrical boss 106 defining a well 108 having a hole formed in its base that extends through to the backside of the circular flange 104. As with the female tag component 42 shown in FIG. 3, female tag component 102 may optionally include a locking insert 110, similar to locking insert 54, disposed in the well 108.

The insecticide ear tag 100 including the insecticide strip 20, can be installed in the ear of an animal using either of the two alternative procedures described above with reference to the attachment of the insecticide strip 20 to the two-piece ID tag 40 shown in FIG. 3. In particular, in a first alternative process, the insecticide strip 20 is attached to the male tag component 44' by inserting the enlarged head portion 60' of the male tag component 44' through the key-hole aperture 26 in the insecticide strip 20 so that the stem 58' resides in the circular hole portion 28 of the aperture 26. The male 44' and female 102 tag components are then loaded onto the applicator 64 referenced above, for installation into the ear 65 of the animal. Specifically, in the same manner described above, the insecticide ear tag 100 is installed in the ear of the animal using the applicator 64 to drive the male tag component 44' to first pierce the ear 65 of the animal and then pass through the hole in the female tag component 102 until the enlarged head portion 60' locks in the locking insert 110 or in the well 108 of the female tag component 102.

Alternatively, and also when replacing an old insecticide strip with a new insecticide strip, the key-hole aperture 26 in the insecticide strip 20 can be opened and passed over the circular flange 56', 104 of either the male or female tag components 44', 102 of a previously installed male 44' and female 102 ear tag combination. Once installed over one of the circular flanges 56', 104, the insecticide strip 20 is then pulled downward until the stem 58' of the male tag component 44' is positioned in the circular hole portion 28 of the aperture 26, in the same manner as described in connection with FIGS. 9-10.

Using either of the above-described installation methods, it is preferable for the insecticide strip 20 to be positioned behind the ear 65 of the animal, as shown and described above in connection with FIG. 6. Positioning of the insecticide strip 20 behind the ear of the animal improves the retention characteristics of the insecticide strip 20.

Advantageously, and unlike a conventional insecticide ear tag, the insecticide strip 20 of the present insecticide tag 100 can be removed and readily replaced multiple times without the need of an applicator 64 each time the insecticide strip 20 is replaced. In other words, the male 44' and female 102 ear tag component combination, once installed in the ear of an animal can remain in place, similar to a conventional two-piece ID tag 40, and the insecticide strip 20 replaced as needed in the manner described above.

Figure 21:
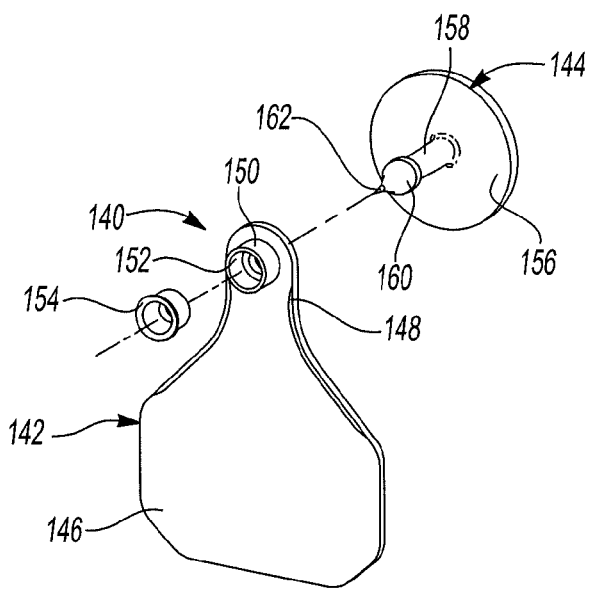
FIG. 21 illustrates an exploded view of a conventional insecticide ear tag.

Turning now to FIGS. 21-24, a method of replacing the spent insecticide-carrying portion of an insecticide ear tag according to the present invention is shown. Referring to FIG. 21, a widely used commercially available two-piece insecticide ear tag 140 is shown. Similar to the ID tag 40 illustrated in FIG. 3, the insecticide tag 140 comprises a female tag component 142 and a male tag component 144. The female tag component 142 has an enlarged lower panel portion 146 that tapers to a relatively narrow upper neck portion 148. Located on the upper neck portion 148 is an integrally formed locking receptacle, comprising a cylindrical boss 150 defining a well 152 containing a locking insert 154. The locking insert 154 has a hole formed in its base that aligns with a hole in the base of the well 152 that extends through to the backside of the female tag component.

Unlike the conventional two-piece ID tag 40, the female tag component 142 of an insecticide ear tag 140 is typically made of a relatively soft, polyvinyl chloride, suitable for being impregnated in the panel portion thereof 146 with an insecticide compound in a manner well known in the art.

The male tag component 144 comprises a circular flange 156 having an integral stem portion 158 projecting therefrom. Stem portion 158 has a circular cross-section and may be formed with a slight taper such that the diameter of the stem portion 158 is greatest at its base where it joins the flange 156. The distal end of the stem portion 158 comprises an enlarged head portion 160 that terminates in a sharp point 162.

Similar to the two-piece ID tag 40, the two-piece insecticide tag 140 is installed in the ear 65 of an animal using an applicator 64 that drives the male tag component 144 to first pierce the ear 65 of the animal and then pass through the hole in the female tag component 142 until the enlarged head portion 160 of the stem 158 locks in the locking insert 154 in the well 152 of the female tag component 142. The construction and installation of a two-piece insecticide ear tag 140 of this type is more fully described in the aforementioned U.S. Pat. No. 4,581,834, which is incorporated herein by reference.

Figure 22:
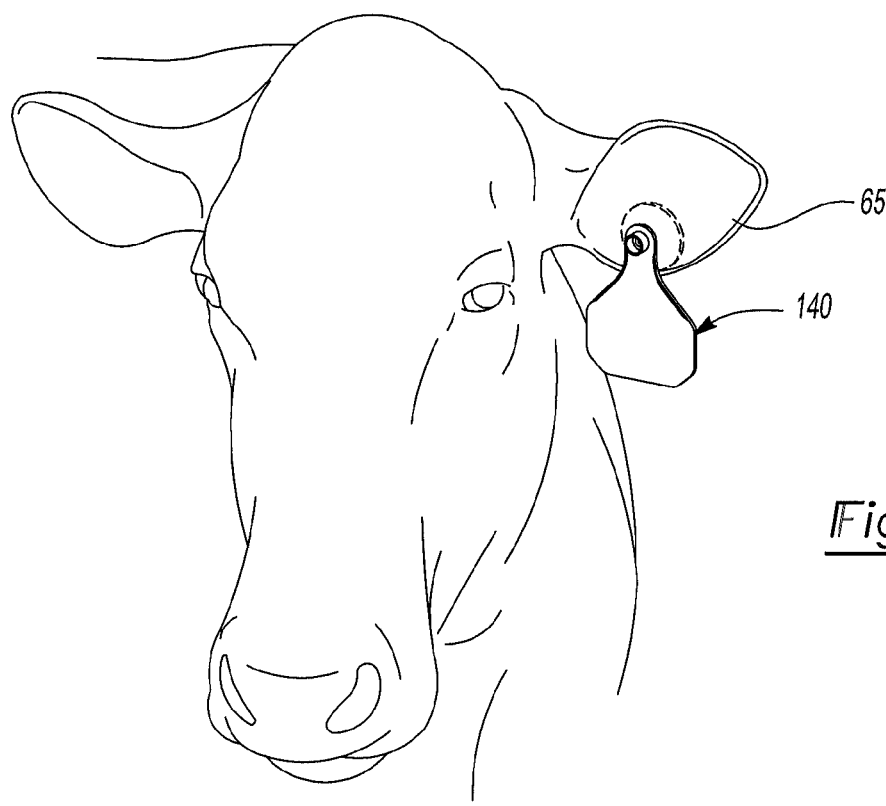
FIG. 22 illustrates a conventional insecticide ear tag installed in the ear of an animal.

FIG. 22 illustrates an insecticide ear tag 140 installed in the ear 65 of an animal. As noted above, the panel portion of the tag 140 is impregnated with an insecticide compound that migrates over the skin of the animal as the animal rubs its head on its body. Conventional insecticide ear tags are typically effective in controlling pests for a period of between 3-5 months, after which time they need to be replaced. In general, when replacing an insecticide tag, it is desirable to switch to a tag having a different active insecticide ingredient to prevent the development of drug resistance in local pest populations.

Figure 23:
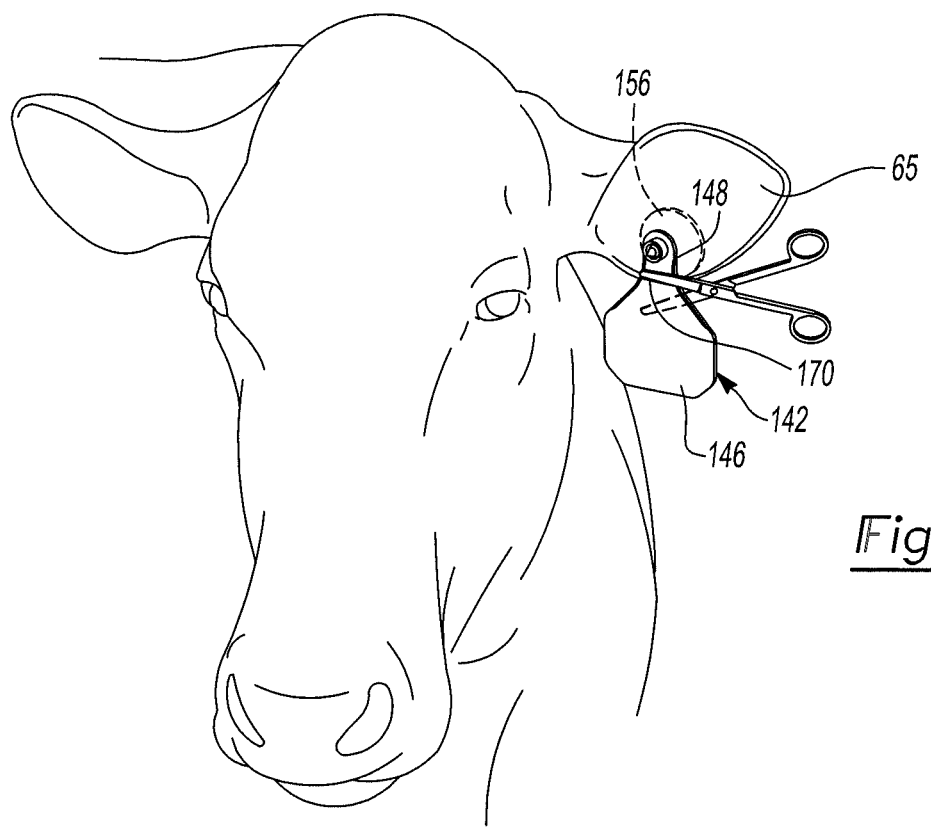
FIG. 23 illustrates a step in the process of replacing a conventional insecticide ear tag.

Utilizing the teachings of the present invention, the insecticide-carrying portion of a conventional insecticide ear tag 140 can be replaced by first removing the panel portion 146 of the female tag component 142 by cutting the tag at the base of the neck portion 148 as shown in FIG. 23 at 170. Thereafter, a new insecticide strip 20 according to the present invention, impregnated with a suitably different insecticide compound, is installed over the circular flange 156 portion of the tag following the procedure described above in connection with FIGS. 7-10. Optionally, the insecticide strip 20 may be attached to the remnant ear tag by passing the upper neck portion 148 of the ear tag 140 through the aperture 26 in the strip 20. However, because the male tag portion 144 of the ear tag 140, including the circular flange 156, is typically made from a more rigid plastic material than the female tag portion 142, it is preferable to position the strip 20 between the male flange portion 156 and the ear of the animal. Note, it is desirable to remove the insecticide-carrying panel portion 146 of the spent insecticide tag 140 so that the residual insecticide compound contained therein does not interfere with the new insecticide compound contained in the replacement insecticide strip 20.

Figure 24:
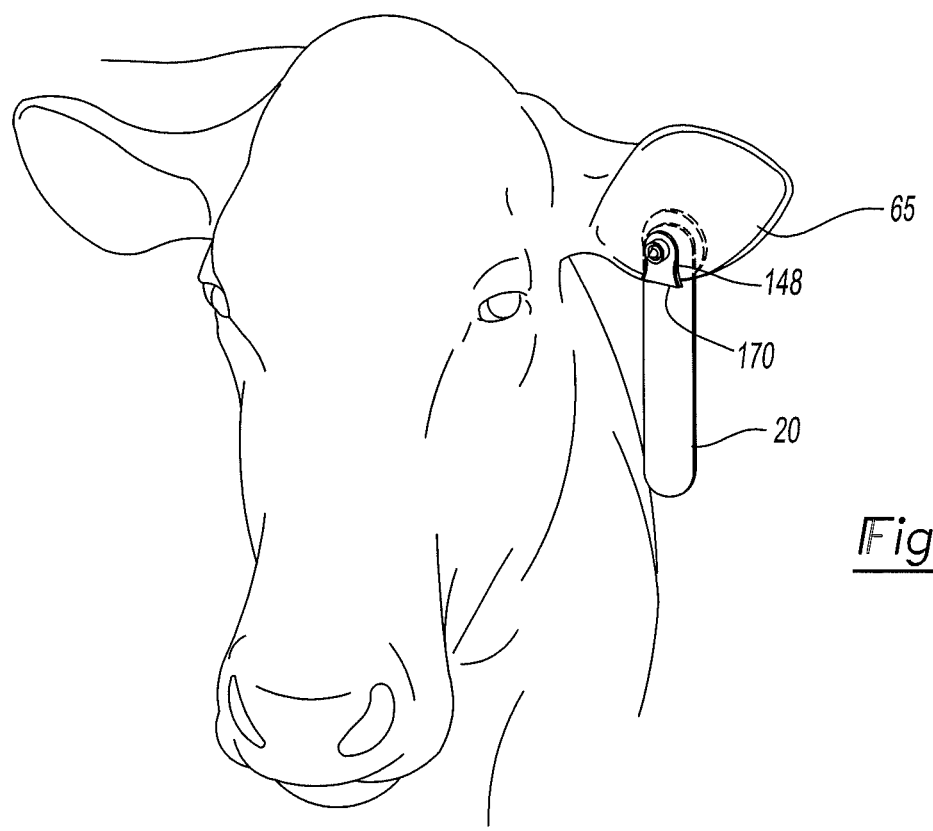
FIG. 24 illustrates an installed insecticide strip attached to the remnant parts of a spent insecticide ear tag.
Figures 27, 28:
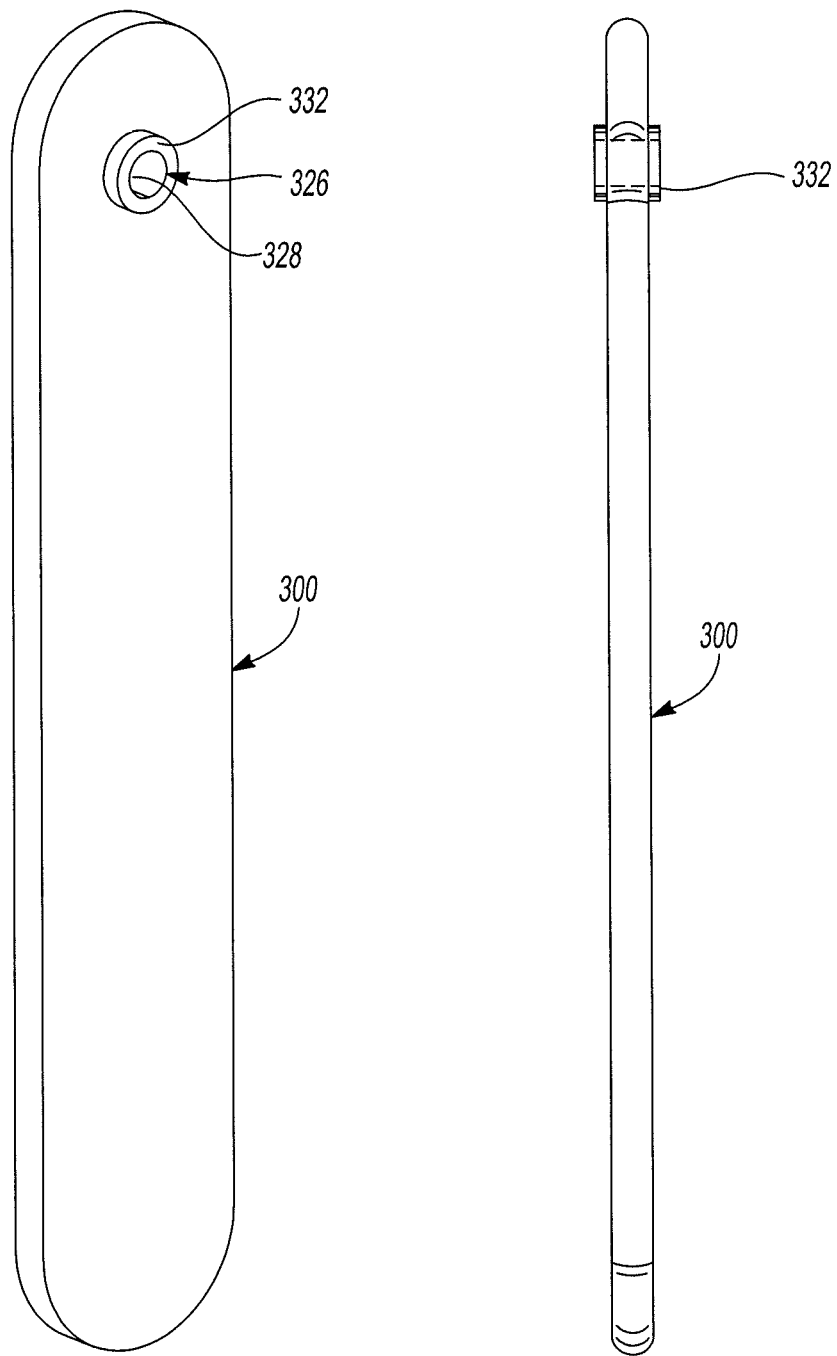
FIGS. 27-28 illustrate another alternative embodiment of the insecticide strip according to the present invention.

Thus, once properly installed, the insecticide strip 20 is securely retained on the remnant portions of the insecticide ear tag 140 in the same manner as described above in connection with ID ear tag 40. In particular, once the strip 20 is manipulated over the circular flange 156, the stem 158 of the male tag component 144 is positioned in the circular hole 28 portion of the aperture 26 so that the insecticide strip 20 is pendularly suspended from the ear tag 140. Preferably, the insecticide strip 20 is positioned on the backside of the animal's ear 65, as shown in FIG. 24, to enhance the retention characteristics of the strip 20.

Referring now to FIGS. 25 and 26, an alternative embodiment of an insecticide strip 200 according to the present invention is shown. The strip 200 preferably comprises an elongated substantially flat, plastic strap having a rounded lower end portion 224 and a generally rectangular-shaped upper end portion 222. The strip 200 generally defines an elongated central axis 225 which in turn defines the upper and lower end portions, 222 and 224 respectively. In this alternative preferred embodiment, the strip 200 is injection molded as an integral member approximately 6 inches in length, 1¼ inches in width along its majority length, and approximately 1/16 of an inch thick. The strip 200 is made of a flexible, relatively soft, polyvinyl chloride, suitable for being impregnated with an insecticide in a manner well known in the art. However, other suitable materials may be used. The resulting large surface area of the strip 200 enables the strip to carry a relatively large quantity of insecticide, thereby improving long term efficacy of the strip.

The upper end portion 222 shown in this embodiment is slightly wider than the width of the remainder of the strip 200, although the strip 200 may alternatively have a uniform width. In addition, the upper end portion 222 may alternatively be configured with more rounded sides so as to form a generally oval shape.

Formed in the upper end portion 222 of the strip 200 is a "key-hole" shaped aperture 226, comprising a central circular hole portion 228 and laterally extending slit portions 230 that project from opposite sides of the circular hole portion 228. Note, the strip 200 may be formed during the injection molding process with thin frangible webs connecting the adjoining sides of the slit portions 230 of the aperture 226. The circular hole portion 228 of the aperture 226 is preferably centered on the axis 225 with the slit portions 230 extending transversely to the axis 225. The diameter of the hole portion 228 is preferably sized to be slightly larger than the diameter of the stem portion of the male button component of a standard two-piece ID tag, for the reasons described below. In addition, the overall length of the slit portions 230 is designed so that, when combined with the diameter of the hole portion 228, the combined distance is approximately equal to or slightly greater than the diameter of the round flange portion of the male component of a standard two-piece ID tag, for reasons also described below.

To help insure against tearing of the upper end portion 222 of the strip 200 adjacent the aperture 226, the boundary of the key-hole shaped aperture 226 is completely closed and reinforced by the formation of a thickened border area 232 immediately surrounding the entire boundary of the aperture 226. As best shown in FIG. 22, this reinforced border area 232 is preferably formed on both sides of the strip 200 so that the overall thickness of the plastic material in the border area 232 is approximately twice the thickness of the remainder of the strip 200.

The strip 200 can be preferably impregnated with insecticide compounds having a variety of EPA-approved active ingredients, including without limitation, pyrethroid, permethrin, zeta-cypermethrin, ivermectin, avermectin, abamectin, milbemectin, diazinon and chlorpyrifos, or any combination thereof.

As will readily be appreciated by those skilled in the art, the alternative embodiment of the insecticide strip 200 shown in FIGS. 21 and 22 can be attached to an ear of an animal utilizing any of the various means described above in connection with the embodiment illustrated in FIGS. 1 and 2. In this instance, however, the step of enlarging the aperture opening illustrated in FIG. 7 is accomplished by grasping the upper end portion 222 of the strip 200 above and below the aperture 226 and pulling apart in a direction generally parallel to the axis 225. In a similar fashion, this step also serves to break any frangible webs that may have formed during the injection molding process between the adjoining sides of the slit portions 230 of the aperture 226. In addition, once the strip 200 is installed over the circular flange portion 56 of the male tag component 44 of a two-piece ID tag 40, or over the upper neck portion 84 of a one-piece ID tag 80, the insecticide strip 200 is moved laterally until the stem 58,86 is positioned in the circular hole portion 228 of the aperture 226.

Due to the elastic nature of the insecticide strip material, once the stem 58,86 is positioned in the circular hole portion 228, the aperture 226 will return to its static closed condition, thereby serving to retain the stem 58,86 in the circular hole portion 228 of the aperture 226. Moreover, as with the first embodiment, the key-hole shaped aperture 226 in strip 200 is configured so that the diameter of the hole portion 228 comprises a minor portion of the overall length of the aperture 226, which greatly enhances the retention characteristics of the strip 200.

Thus, once properly installed, the insecticide strip 200 according to the present invention is securely retained on the ID ear tag 40,80 for the useful life of the insecticide strip. Moreover, because the circular hole portion 228 of the key-hole aperture 226 in the strip 200 is designed to be slightly larger than the diameter of the stem 58,86 of the ID ear tag 40,80, the strip 200 is pendularly suspended from the ID tag 40,80, thereby enabling the strip 200 to freely pivot about the stem 58,86 of the ID tag 40,80. The ability of the strip 200 to freely pivot about the stem 58,86 of the ID tag 40,80, together with the reinforced boundary 232 which completely surrounds and encloses the aperture 226, significantly enhances the long-term retention characteristics of the strip 200 by reducing the likelihood of the strip 200 being torn from the ID tag when the animal rubs its head against its body or other objects. In addition, the pendular movement of the strip 200 also enhances the transfer of insecticide from the strip 200 to the body of the animal.

The foregoing description of the embodiments has been provided for purposes of illustration and description. It is not intended to be exhaustive or to limit the disclosure. Individual elements or features of a particular embodiment are generally not limited to that particular embodiment, but, where application, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An insecticide strip for attachment to an animal ear tag comprising a male tag component having a substantially cylindrical post for extending through the ear of the animal and a female tag component having an upper attachment portion configured to lockably engage the male tag component and a lower panel portion, the insecticide strip comprising:

an elongated plastic member containing an insecticide compound, and having an upper portion and a lower portion defining an axis, wherein the upper portion of said member has formed therein an aperture having a substantially circular portion and a slit portion extending from said circular portion, wherein said plastic member is configured to be attached to said male tag component via said aperture, wherein said elongated plastic member is configured to be of sufficient length so that a substantial portion thereof extends beyond the male tag component and the lower panel portion of the female tag component when the insecticide strip is in use;

wherein the diameter of said circular portion of said aperture is sized to receive said post when said strip is attached to the male tag component so that the strip is pendularly suspended from the post of the male tag component and positioned between said male and female tag components; and further wherein said aperture has a completely closed boundary and wherein a boundary region surrounding said aperture is reinforced.

2. The insecticide strip of claim 1, wherein the length of said slit portion of said aperture is substantially greater than the diameter of said circular portion.

3. The insecticide strip of claim 1, wherein the lower portion of said elongated plastic member is formed with a first thickness and said reinforced boundary region has a second thickness greater than said first thickness.

4. The insecticide strip of claim 2, wherein said slit portion of said aperture extends downward from said substantially circular portion in a direction substantially parallel to said axis.

5. The insecticide strip of claim 2, wherein said slit portion of said aperture extends laterally from said substantially circular portion transverse to said axis.

6. The insecticide strip of claim 1, wherein the male tag component further includes a substantially circular flange oriented transversely to said post, and further wherein the overall length of said aperture is substantially equal to the diameter of said circular flange.

7. The insecticide strip of claim 6, wherein the diameter of said circular portion of said aperture is substantially smaller than the diameter of said circular flange.

8. The insecticide strip of claim 1, wherein the elongated plastic member is molded from a relatively soft, polyvinyl chloride material that is impregnated with said insecticide compound.

9. The insecticide strip of claim 1, wherein the male tag component further includes a substantially circular flange oriented transversely to said post, and further wherein the strip is integrally formed from a flexible plastic material and said aperture is configured so as to present a substantially closed static condition wherein the slit portion of the aperture is essentially closed and the size of the aperture opening is minimized, and an open condition wherein the slit portion of the aperture is opened and the size of said aperture opening is sufficiently enlarged to enable said substantially circular flange to pass therethrough.

10. The insecticide strip of claim 9, wherein said aperture assumes said substantially closed static condition when the insecticide strip is pendularly suspended from the post of the animal ear tag.

* * * * *